United States Patent Office 2,824,404
Patented Feb. 25, 1958

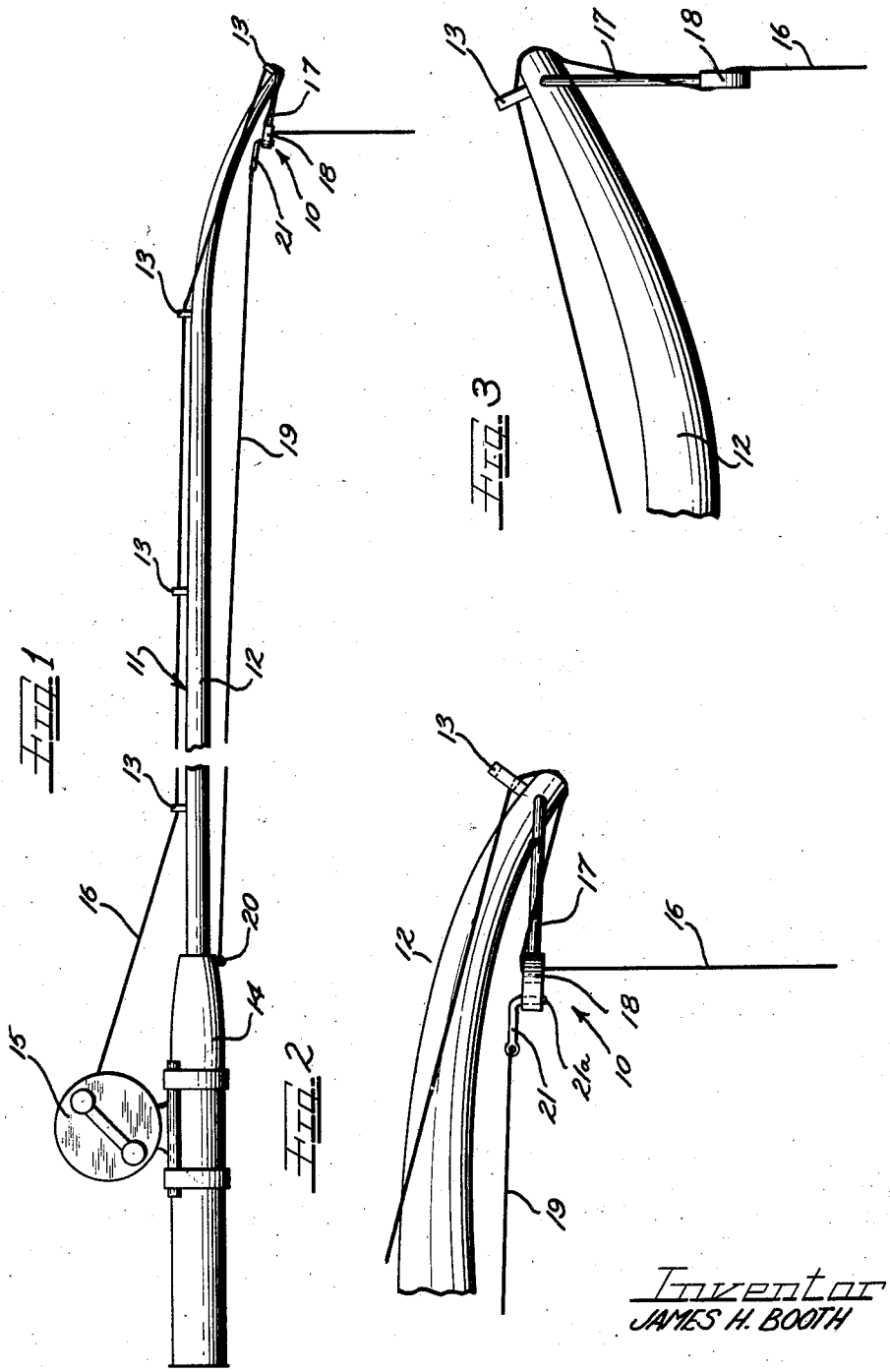

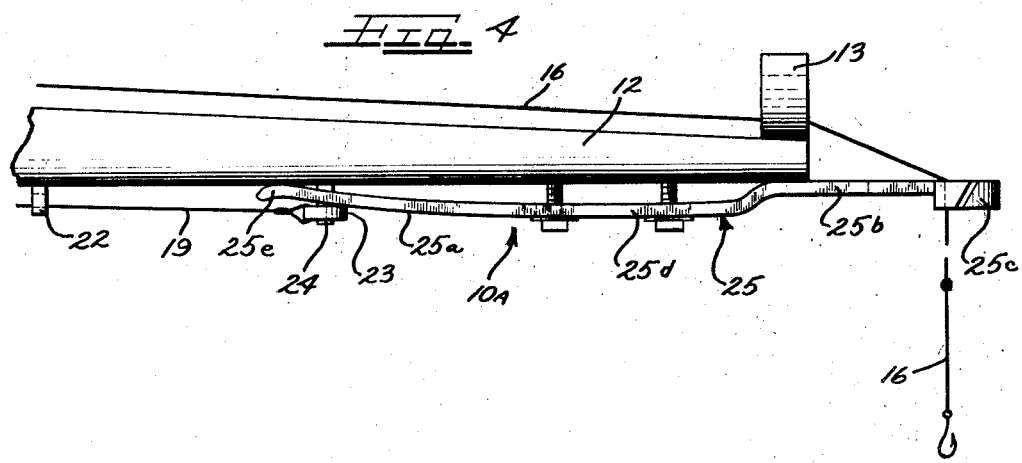
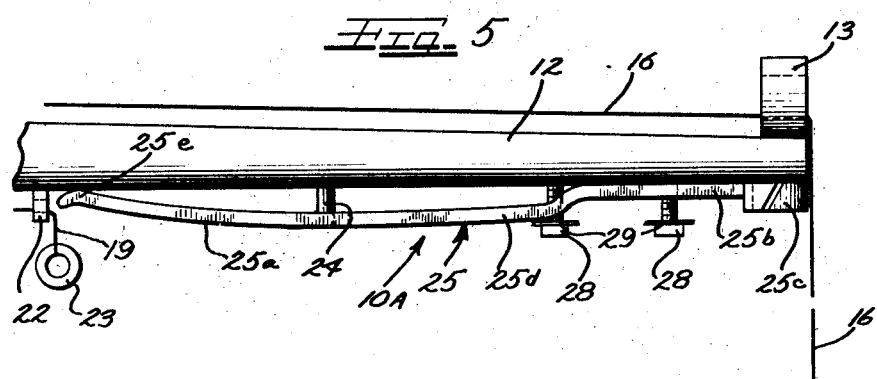
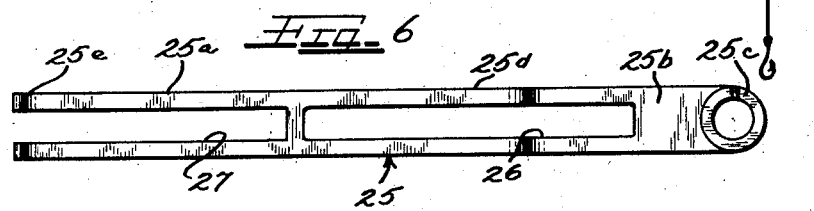

2,824,404
FISH HOOK SETTING DEVICE
James H. Booth, Detroit, Mich.
Application December 5, 1955, Serial No. 551,007
4 Claims. (Cl. 43—15)

This invention relates in general to fishing equipment and more particularly a fishing pole in combination with a fish hook setting device.

The present invention deals specifically with a fishing pole equipped with means for preloading the pole so that a slight pull by a fish on the hook will cause a release of the preload in the pole and jerk the line to firmly imbed the hook into the fish.

Heretofore, various types of fish hook setting devices have been developed, but in each case that I am aware of, each device has been constructed of a plurality of complicated parts which are relatively expensive to manufacture. Moreover, each such device has functioned distinctly independently of the fishing pole.

Accordingly, it is an object of this invention to obviate the above named difficulties and provide a fish hook setting device in association with a fishing pole having a minimum of parts, and which may be economically manufactured.

Another object of this invention is to provide a fish hook setting device which may be easily installed on any conventional type of fishing pole.

A further object of this invention resides in the provision of a fish hook setting device in combination with a fishing pole, wherein the flexibility of the fishing pole is utilized to effect operation of the fish hook setting device.

A further feature of this invention is in the provision of a fish hook setting device carried on a fishing pole which automatically sets the hook in the mouth of a fish after the fish has nibbled on the hook.

A further object of this invention resides in the provision of a fishing pole equipped with means for preloading the pole so that a slight pull by a fish on the hook will cause a release of the preload in the pole and pull on the line that will firmly imbed the hook into the fish.

A still further object of this invention is to provide a fish hook setting device in combination with a fishing pole, wherein the fish hook setting device may be rendered inoperative to convert the fishing pole to a casting rod easily and quickly.

Other objects, features, and advantages of the invention will be apparent from the following detailed disclosure, taken in conjunction with the accompanying sheet of drawings, wherein like reference numerals refer to like parts, in which:

On the drawings:

Figure 1 is a broken side elevational view of a fishing pole equipped with a fish hook setting device in accordance with the principles of the invention, and illustrating the fishing pole in a preloaded position wherein the fish hook setting device is in "set" position;

Figure 2 is an enlarged fragmentary elevational view of the tip end of the pole shown in Figure 1, illustrating in greater detail a part of the invention;

Figure 3 is a fragmentary view similar to Figure 2 but illustrating the invention where the fish hook setting device has been sprung and showing the tip end of the fishing pole in a reversely bent position prior to returning to the normal unbiased position;

Figure 4 is a fragmentary side elevational view of the tip end of a fishing pole equipped with a modified form of fish hook setting device, illustrating the device in preload position;

Figure 5 is an enlarged fragmentary view similar to Figure 4 but illustrating the fish hook setting device in inoperative position to enable the fishing pole for use as a bait casting rod; and Figure 6 is a bottom plan view of a portion of the fish hook setting device employed and as illustrated in Figures 4 and 5.

As shown on the drawings:

Referring to Figures 1–3 on the drawing, the fish hook setting device according to the invention is generally designated by the numeral 10 and shown in association with a conventional fishing pole 11.

The fishing pole may be of any conventional type, and the instant illustration is in the form of a casting rod and reel comprising a flexible pole portion 12 having a plurality of spaced and aligned line guides 13, and a handle 14 secured to the heavy end of the pole portion. A casting reel 15 is secured to the handle 14 by any suitable means and, of course, carries a reel of fishing line such as that designated by the numeral 16. The fishing line is threaded through the line guides 13 to be fed from the tip end of the pole portion 12. While not shown, it is of course understood that a fish hook of any desirable type may be secured to the free end of the line 16 extending from the tip end of the pole 12.

The fish hook setting device 10 includes a lever 17 pivotally or swingably carried on one end to the tip end of the pole portion 12, and having a loop or eye 18 formed at the other or free end through which the line 16 is threaded as illustrated. A locking line 19 is anchored at one end to a point on the fishing pole portion substantially spaced from the tip end thereof, and in the instant case, to an eyelet 20 secured to the fishing pole handle 14. The other end of the locking line 19 is secured to a bent pin of substantially inverted L-shape, as indicated by the numeral 21. The pin 21 carries a leg 21a, remote from the connection to the line 19, which leg portion is slidably or frictionally received by the loop 18 of the lever 17 when the pole portion 12 is preloaded. The combined lengths of the locking line 19, the pin 21, and the lever 17 is less than the natural free length distance between the tip end of the pole portion 12 and the point at which the locking line 19 is anchored to the pole portion.

In operation, to preload the pole portion 12 and set the fish hook setting device, the fisherman must bend the pole so that the pin 21 can be inserted in the loop 18 of the lever 17. The pole is then allowed to flex and the pin 17 will be held by the loop 18 by the frictional engagement between the members. And now the pole is in a preloaded position. As already explained, the fishing line 16, after extending through the tip end of line guide 13 is threaded through the loop 18 of the lever 17 as shown in the drawings. It will be understood that the pole portion 12 is preloaded after the line is cast or allowed to sink into the water.

When the fishing reel 15 is either prelocked or loaded by a clutch or brake, a slight pull on the line 16, such as that caused by a fish nibbling or striking the hook, will unlatch the lever 17 from the pin 21 to release the fish hook setting device. The fishing pole will then spring in the opposite direction and ben the pole upward, such as illustrated in Figure 3 due to the inertia on the tip end of the pole before returning to its original unbiased position. This action will impart a quick upward movement or jerk on the line 16 and firmly imbed the hook in the mouth of the fish. Hence, it is seen that the natural flexibility of the fishing pole portion 12 is utilized to serve as a spring for the fish hook setting device. With a fish hook setting device as constructed in accordance with the principles of the present invention, it is not necessary to cut the line or tie a knot in the line to a separate fish hook setting device.

When it may be desired to necessitate a heavier pull on the hook to release the preload in the pole, such as when fishing in swift water, the fisherman merely shortens the length of the locking line 19, thereby causing a greater preload on the fishing pole. A greater preload, in turn, causes a greater frictional engagement between the bent pin 21 and the lever eye 18. Thus a heavier pull is needed to break the greater frictional engagement. Conversely, lengthening the locking line 19, enables the preload to be released by a hair trigger action.

A different form of the invention is illustrated in Figures 4 to 6, and designated generally by the numeral 10A. Where possible, like parts will be identified by like reference numerals already applied in Figures 1 to 3. In principle, this form of the fish hook setting device in this embodiment functions similarly to the first embodiment in that the fishing pole 12 is initially preloaded and triggered to release the free load upon the pull at the hook end of the line 16.

The preloading or locking line 19 is threaded through a closed guide 22 carried at the underside of the fishing pole 12 at a point inwardly spaced from the outer tip end thereof. A ring 23 is suitably fastened to the very end of the locking line 19 to be frictionally received on a stationary pin 24 projecting downwardly from the underside of a fishing pole at a substantially right angle thereto. The other end of the locking line 19 is fastened to the base of the fishing pole, in such a manner as shown in Figure 1, and the length of the locking line is less than the distance from the pin 24 to the base securing point so that when the ring 23 is received on the pin 24, the fishing pole 12 is bent and preloaded in a manner similar to that shown in Figure 1. As explained with reference to the first embodiment, the amount of preload may be varied according to the length of the locking line 19.

For dislodging or disengaging the ring 23 from the pin 24, an elongated actuating member 25, preferably of spring steel, is provided having a camming portion 25a. The actuating member 25 or trigger member also carries at its forward end a rod engaging portion 25b for bearing against the underside of the rod or pole 12. At the free end of the portion 25b, a slotted line guide ring 25c receives the fishing line 16. Extending rearwardly from the pole engaging portion 25b is an offset portion 25d which is spaced from the underside of the pole 12 and merges with the cammed portion 25a. At the very end of the cammed portion 25a is a second pole engaging portion 25e. The actuating member 25 is provided with a pair of elongated slots 26 and 27 along the longitudinal axis thereof. The slot 26 extends from about the center of the front pole engaging portion 25b rearwardly to the beginning of the camming portion 25a, while the slot 27 begins at a point slightly rearwardly from the adjacent end of the slot 26 and extends rearwardly to open at the pole engaging portion 25e. The actuating member 25 is slidably received the underside of the rod 12 and held on the pole by a pair of tensioned screws 28 axially spaced along the underside of the pole 12. The screws 28 extend through the forward slots 26 in the member and are threadedly received in the pole. Carried on each screw 28 is a washer 29 sized to be diametrically larger than the width of the slot 26 to prevent the head of the screws 28 from pulling through the slot. The rear slot 27 accommodates the pin 24 during the axial movement of the actuating member 25.

When the fish hook setting device 10a is not in use and the pole is desired to be employed as a casting rod, the pole is in the non-preloaded position. In this position, the tension line 19 is held securely under the rod in a relaxed position as it is fastened at the base of the pole 12 and the ring 23 is of such size as to prevent the line from slipping back through the closed guide 22. The actuating member 25 is then retracted or pushed back along the pole 12 to an inward limit as shown in Figure 5. The length of the slots 26 and 27 are sized so that the forward end of one of these slots provide the limit or stop, wherein the front end of the slot 26 abuts against the forward screw 28 or the front end of the slot 27 abuts against the pin 24. It may be noted that the slotted line guide 25c does not project outwardly from the tip end of the pole 12 to obstruct the action of the line 16. Due to the rear tension screw 28, the actuating member 25 is held in place and against flopping or relative movement with respect to the pole 12. The pole can now be employed as a standard casting rod.

When the fish hook setting device 10a is to be used, the actuating member 25 is protracted or pulled forward substantially to the limit of the rear slot 27, as seen in Figure 4. The fishing line 16 is then slipped into the slotted line guide 25c through the side slot. The camming portion 25a of the actuator is now so positioned so that an exposed portion of the pin 24 is available to receive the ring 23. In preloading, the pole is bent to a position which will allow the ring 23 to be received on the pin 24, thus, preloading the pole 12. A downward pull on the fish hook end of the line 16 causes an inward thrust on the slidable actuating member 25 as applied against the inner end of the slotted line guide 25c to thereby cause a sliding action rearwardly of the actuating member. As the sliding action takes place, the camming portion 25a of the actuating member forces the ring 23 off the pin 24 which permits freedom of the pole 12 and an upward pull on a fish line to securely imbed the hook into the fish's mouth.

From the foregoing, it will now be seen that the present invention provides a combination fishing pole and fish hook setting device having a minimum of parts, which may be efficiently and easily operated, and economically manufactured.

It will be understood that modifications and variations may be effected without departing from the scope of the novel concepts of the present invention, but it is understood that this application is to be limited only by the scope of the appended claims.

I claim as my invention:

1. The combination of a fishing pole and a device for the loading the pole in such a manner that the pole will impart a jerk to the fishing line when the line is pulled, said pole having a fishing line extending from the tip end thereof and a hook on the free end of said line, said device including a pin fixed to the underside of the said pole and spaced inwardly from the tip end thereof, means slidably engaging said pin for preloading the pole, and means slidably mounted on the underside of the pole and near the tip end thereof, said slidably mounted means having a line guide at the outer end thereof for freely receiving the fishing line, whereby the slidably mounted means disengages said engaging means slidably engaging said pin from said pin in response to a predetermined movement of said fishing line.

2. The combination as set forth in claim 1 wherein the means slidably mounted on the underside of the pole comprises an elongated actuating member having longitudinal slots therein, a slotted line guide at the outer end for receiving the fishing line and a cam portion at the inner end thereof for disengaging said means slidably engaging said pin from said pin upon relative movement with said pole in response to the predetermined movement of said fishing line.

3. The combination of claim 1 wherein the means slidably engaging the pin includes a loading line anchored at one end to the pole near the base thereof and having a ring at the free end for engaging said pin, the length of the line being less than the distance from said pin to the anchoring point on the pole.

4. The combination of claim 1 wherein the means slidably engaging said pin for preloading the pole includes a loading line anchored at one end to the pole near the base thereof and having a ring at the free end for engaging said pin, the length of the line being less than the distance from said pin to the anchoring point on the pole and wherein the means slidably mounted on the underside of the pole comprises an elongated actuating member having longitudinal slots therein together with a slotted line guide at the outer end thereof for receiving the fishing line and a camming portion at the inner end for disengaging said ring from said pin upon relative movement with the pole in response to a predetermined movement of said fishing line.

References Cited in the file of this patent

UNITED STATES PATENTS 2,578,887   Jackson et al. _____ Dec. 18, 1951